United States Patent
Nair et al.

(10) Patent No.: US 11,281,466 B2
(45) Date of Patent: Mar. 22, 2022

(54) REGISTER RENAMING AFTER A NON-PICKABLE SCHEDULER QUEUE

(71) Applicants: ADVANCED MICRO DEVICES, INC., Santa Clara, CA (US); ATI TECHNOLOGIES ULC, Markham (CA)

(72) Inventors: Arun A. Nair, Santa Clara, CA (US); Michael Estlick, Fort Collins, CO (US); Erik Swanson, Fort Collins, CO (US); Sneha V. Desai, Markham (CA); Donglin Ji, Fort Collins, CO (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 16/660,495

(22) Filed: Oct. 22, 2019

(65) Prior Publication Data
US 2021/0117196 A1 Apr. 22, 2021

(51) Int. Cl.
*G06F 9/30* (2018.01)
*G06F 9/38* (2018.01)

(52) U.S. Cl.
CPC .......... *G06F 9/30043* (2013.01); *G06F 9/384* (2013.01); *G06F 9/3867* (2013.01)

(58) Field of Classification Search
CPC .................................................. G06F 9/30043
See application file for complete search history.

(56) References Cited

U.S. PATENT DOCUMENTS

| | | | | |
|---|---|---|---|---|
| 6,442,677 | B1* | 8/2002 | Meyer | G06F 9/30043 |
| | | | | 712/216 |
| 6,460,130 | B1* | 10/2002 | Trull | G06F 9/30152 |
| | | | | 710/57 |
| 6,826,704 | B1 | 11/2004 | Pickett | |
| 2010/0332806 | A1* | 12/2010 | Golla | G06F 9/3851 |
| | | | | 712/216 |
| 2013/0086365 | A1* | 4/2013 | Gschwind | G06F 9/30072 |
| | | | | 712/220 |
| 2014/0129804 | A1 | 5/2014 | King | |

(Continued)

FOREIGN PATENT DOCUMENTS

KR 10-2015-0079408 7/2015

OTHER PUBLICATIONS

International Search Report and Written Opinion for counterpart Application No. PCT/US2020/056826 dated Feb. 10, 2021, 8 pages.

*Primary Examiner* — Michael J Metzger (57) ABSTRACT

A floating point unit includes a non-pickable scheduler queue (NSQ) that offers a load operation concurrently with a load store unit retrieving load data for an operand that is to be loaded by the load operation. The floating point unit also includes a renamer that renames architectural registers used by the load operation and allocates physical register numbers to the load operation in response to receiving the load operation from the NSQ. The floating point unit further includes a set of pickable scheduler queues that receive the load operation from the renamer and store the load operation prior to execution. A physical register file is implemented in the floating point unit and a free list is used to store physical register numbers of entries in the physical register file that are available for allocation.

24 Claims, 4 Drawing Sheets

(56) References Cited

U.S. PATENT DOCUMENTS

| | | | |
|---|---|---|---|
| 2014/0136819 A1* | 5/2014 | Venkataramanan | G06F 9/3857 |
| | | | 712/220 |
| 2014/0281402 A1* | 9/2014 | Comparan | G06F 9/3838 |
| | | | 712/214 |
| 2017/0286114 A1 | 10/2017 | Herdrich et al. | |
| 2018/0004527 A1* | 1/2018 | Adeeb | G06F 9/3838 |
| 2018/0052613 A1 | 2/2018 | McDaniel et al. | |
| 2019/0171452 A1* | 6/2019 | King | G06F 9/3004 |

* cited by examiner

REGISTER RENAMING AFTER A NON-PICKABLE SCHEDULER QUEUE

BACKGROUND

Processing systems often include coprocessors such as floating point units (FPUs) to supplement the functions of a primary processor such as a central processing unit (CPU). For example, an FPU executes mathematical operations such as addition, subtraction, multiplication, division, other floating point instructions including transcendental operations, bitwise operations, and the like. The FPU receives instructions for execution, decodes the instructions, and performs any necessary address translations for operations included in the instructions. The FPU also performs register renaming by allocating one or more physical register numbers to one or more architectural registers associated with the operation. The physical register numbers indicate entries in a physical register file that store operands or results for the operation. The FPU also includes a scheduler for scheduling operations that have been allocated entries in the physical register file. In some cases, the FPU scheduler is a distributed scheduler that employs at least two levels of scheduler queues: (1) a first level having a non-pickable scheduler queue and (2) a second level having two or more pickable scheduler queues. The pickable scheduler queues store instruction operations for a corresponding subset of a plurality of execution pipes. The non-pickable scheduler queue serves to temporarily buffer instruction operations from the instruction pipeline front end before the instruction operations are allocated to the pickable scheduler queues.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Load operations for instructions executing on a floating-point unit (FPU) are provided to a load store unit concurrently with the FPU allocating an entry in a physical register file to hold the load data for the load operation. Initially, a conventional FPU performs renaming for the load operation prior to buffering the load operation in a non-pickable scheduler queue. Load operations are not scheduled from the non-pickable scheduler queue (to one of the pickable scheduler queues) until the load store unit returns the load data that is to be loaded by the load operation. Retrieving the load data from memory or a cache typically requires several cycles and the load operation remains in the non-pickable scheduler queue for at least this time interval. However, as discussed above, physical register numbers are allocated to the load operation prior to adding the load operation to the non-pickable scheduler queue. Load operations therefore consume physical register numbers from the free list for at least the time interval required for the load store unit to return the load data for the load operation, which effectively reduces the size of the free list (e.g., the number of free physical register numbers) available to other operations in the FPU.

FIGS. 1-4 disclose embodiments of an architecture that improves performance of an FPU by storing instructions in a non-pickable scheduler queue prior to renaming architectural registers used by operations in the instructions and allocating physical register numbers to the operations. In response to renaming the architectural registers associated with an operation, such as a load operation, the operation is added to one of a set of pickable scheduler queues that store operations for a corresponding subset of a plurality of execution pipes. The non-pickable scheduler queue buffers load operations concurrently with a load store unit retrieving load data for an operand that is to be loaded by the load operation. The FPU also includes a load mapper that allocates physical register numbers to load operations in response to the load data being returned by the load store unit. In some embodiments, the physical register numbers are allocated from a physical register number (PRN) buffer that holds a subset of available physical register numbers provided by the free list. The physical register numbers allocated to the load operation are mapped to a retire identifier in a corresponding mapping structure. If the load operation is popped from the non-pickable scheduler queue before the load store unit returns the load data, a physical register number is allocated to the load operation from the free list. If the load store unit returns the load data before the load operation is popped from the non-pickable scheduler queue, a physical register number is allocated to the load operation from the PRN buffer. In either case, the mapping of the physical register number to the retire identifier is stored in the mapping structure to prevent allocating another physical register number to the same load operation. The effective size of a free list in the FPU is therefore increased, and performance of the FPU improved, because physical register numbers from the free list are not allocated to the load operations until the load operation is popped from the non-pickable scheduler queue or the load store unit returns the load data, whichever comes first.

Figure 1:
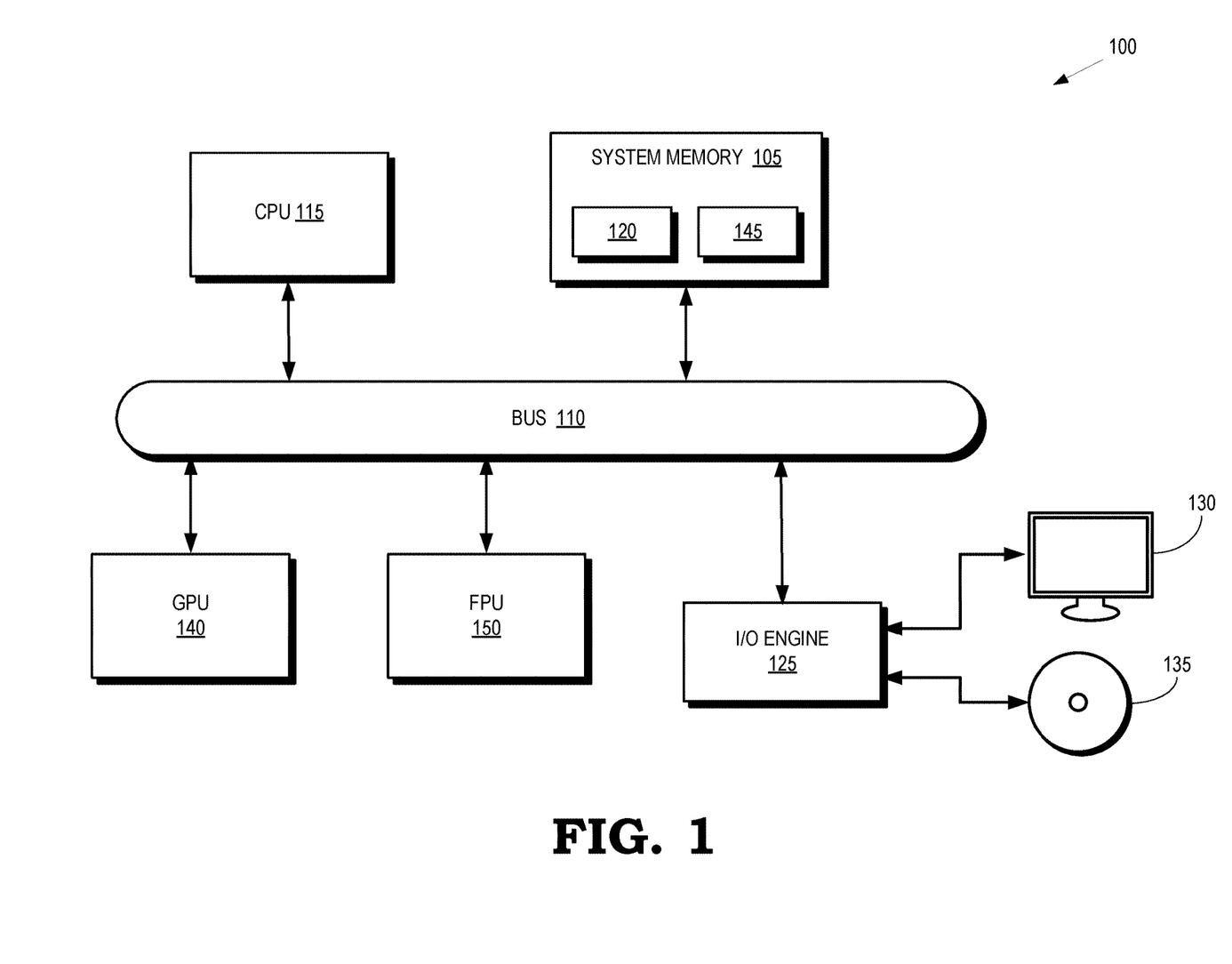
FIG. 1 is a block diagram of a processing system that performs register renaming after buffering instructions or operations in a non-pickable scheduler queue (NSQ) according to some embodiments.

FIG. 1 is a block diagram of a processing system 100 that performs register renaming after buffering instructions or operations in a non-pickable scheduler queue according to some embodiments. The processing system 100 includes or has access to a memory 105 (e.g., system memory) or other storage component that is implemented using a non-transitory computer readable medium such as a dynamic random access memory (DRAM). However, some embodiments of the memory 105 are implemented using other types of memory including static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a central processing unit (CPU) 115. Some embodiments of the CPU 115 include multiple processing elements (not shown in FIG. 1 in the interest of clarity) that execute instructions concurrently or in parallel. The processing elements are referred to as processor cores, compute units, or using other terms. The CPU 115 is connected to the bus 110 and communicates with the memory 105 via the bus 110. The CPU 115 executes instructions such as program code 120 stored in the memory 105 and the CPU 115 stores information in the memory 105 such as the results of the executed instructions. The CPU 115 is also able to initiate graphics processing by issuing draw calls.

An input/output (I/O) engine 125 handles input or output operations associated with a display 130, as well as other elements of the processing system 100 such as keyboards, mice, printers, external disks, and the like. The I/O engine 125 is coupled to the bus 110 so that the I/O engine 125 communicates with the memory 105, the CPU 115, or other entities that are connected to the bus 110. In the illustrated embodiment, the I/O engine 125 reads information stored on an external storage component 135, which is implemented using a non-transitory computer readable medium such as a compact disk (CD), a digital video disc (DVD), and the like. The I/O engine 125 also writes information to the external storage component 135, such as the results of processing by the CPU 115.

The processing system 100 includes a graphics processing unit (GPU) 140 that renders images for presentation on the display 130. For example, the GPU 140 renders objects to produce values of pixels that are provided to the display 130, which uses the pixel values to display an image that represents the rendered objects. Some embodiments of the GPU 140 are used for general purpose computing and performs reduction and scan operations on ordered sets of elements, among other operations. In the illustrated embodiment, the GPU 140 communicates with the memory 105 (and other entities that are connected to the bus 110) over the bus 110. However, some embodiments of the GPU 140 communicate with the memory 105 over a direct connection or via other buses, bridges, switches, routers, and the like. The GPU 140 executes instructions stored in the memory 105 and the GPU 140 stores information in the memory 105 such as the results of the executed instructions. For example, the memory 105 stores a copy 145 of instructions that represent a program code that is to be executed by the GPU 140.

A floating-point unit (FPU) 150 supplements the functions of the CPU 115 and the GPU 140. The FPU 150 executes mathematical operations such as addition, subtraction, multiplication, division, other floating-point instructions including transcendental operations, bitwise operations, and the like. Although not shown in FIG. 1 in the interest of clarity, the FPU 150 includes a non-pickable scheduler queue (NSQ), a renamer, and a set of pickable scheduler queues associated with corresponding execution pipes. The NSQ buffers a load operation concurrently with a load store unit retrieving load data for an operand that is to be loaded by the load operation. The renamer renames architectural registers used by the load operation and allocates physical register numbers to the load operation in response to receiving the load operation from the NSQ. The set of pickable scheduler queues receives the load operation from the renamer and stores the load operation prior to execution. The FPU 150 also implements (or has access to) a physical register file and a free list that stores physical register numbers of entries in the physical register file that are available for allocation.

Figure 2:
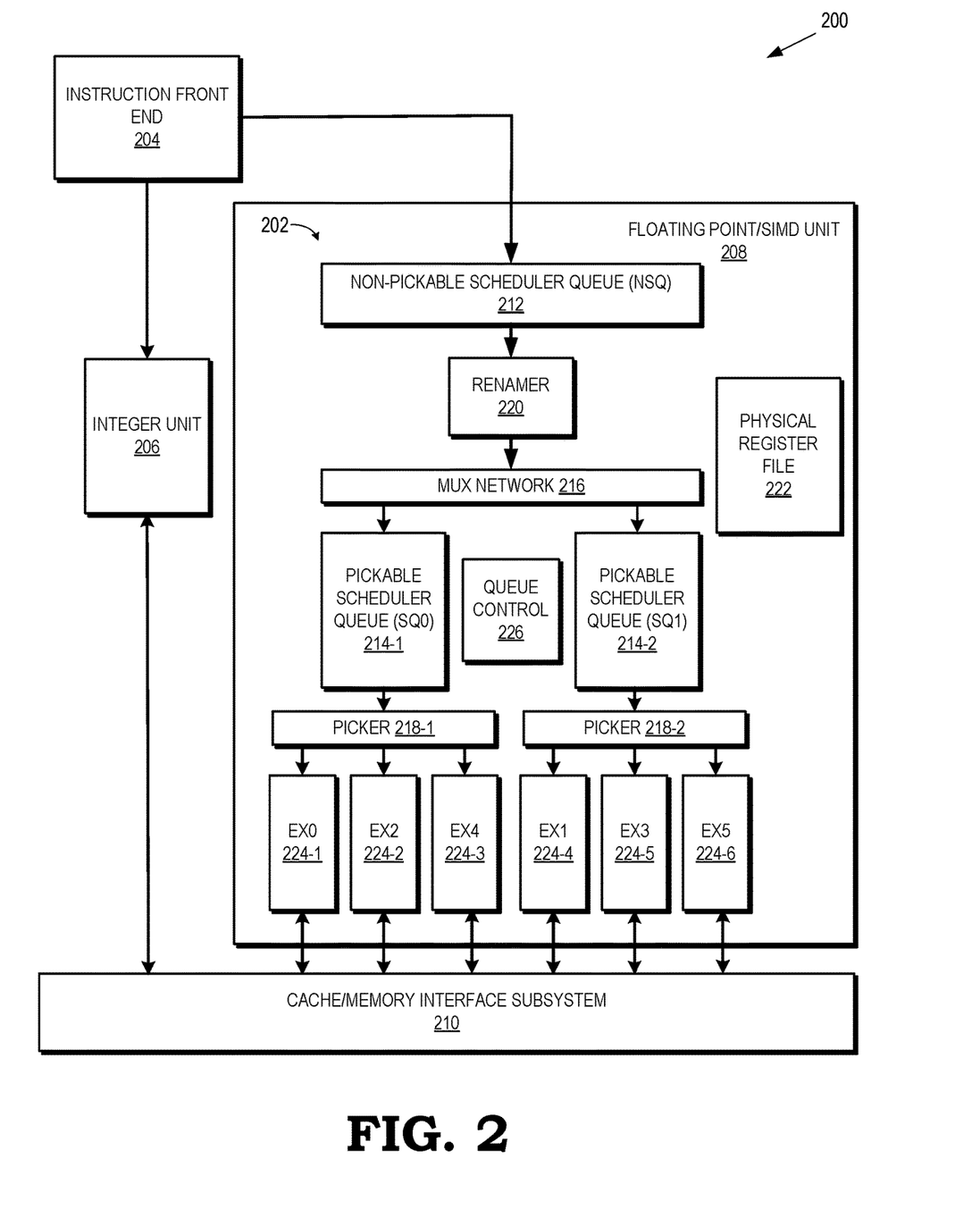
FIG. 2 is a block diagram of a processor implementing a multimodal distributed scheduler for queue and execution pipe balancing in accordance with some embodiments.

FIG. 2 is a block diagram of a processor 200 implementing a multimodal distributed scheduler 202 for queue and execution pipe balancing in accordance with some embodiments. The processor 200 includes an instruction front end 204, one or more instruction execution units, such as an integer unit 206 and a floating point/single instruction multiple data (SIMD) unit 208, and a cache/memory interface subsystem 210. The instruction front end 204 operates to fetch instructions as part of an instruction stream, decode instructions into one or more instruction operations (e.g., micro-operations, or uops), and then dispatch each instruction operation to one of the execution units 206, 208 for execution. In executing an instruction operation, the execution unit frequently makes use of one or more caches implemented at the cache/memory interface subsystem 210, or accesses data from, or provides data for storage to, an external memory (e.g., a random access memory, or RAM) or external input/output (I/O) device via a load/store unit (LSU), memory controller, or I/O controller (not shown) of the cache/memory interface subsystem 210.

The processor 200 implements the multimodal distributed scheduler 202 at each of one or more of the execution units of the processor 200. For purposes of illustration, an implementation in which the multimodal distributed scheduler 202 is implemented at the floating point/SIMD unit 208 is described herein. However, in other embodiments the integer unit 206 or other execution unit of the processor 200 implements a multimodal distributed scheduler in addition to, or instead of, the one implemented by the floating point/SIMD unit 208 using the guidelines provided herein.

The multimodal distributed scheduler 202 implements a two-level queueing process, whereby the first scheduler queue 212 temporarily buffers instruction operations, which are then allocated among the plurality of second scheduler queues 214 via a multiplexer (mux) network 216. The picker 218 for each second scheduler queue 214 picks instruction operations buffered in the corresponding second scheduler queue 214 for assignment or other allocation to execution pipes of the subset associated with the corresponding second scheduler queue 214. As instruction operations are not pickable for execution directly from the first scheduler queue 212, the first scheduler queue 212 is referred to herein as the "non-pickable scheduler queue 212" or the "NSQ 212". Conversely, as instruction operations are pickable from the second scheduler queues 214 for execution, the second scheduler queues 214 are each referred to herein as a "pickable scheduler queue 214" or "SQ 214".

The floating point/SIMD unit 208 includes a rename module 220, a physical register file 222, and a plurality of execution pipes 224, such as the six execution pipes 224-1 to 224-6 in the depicted embodiment, as well as the multimodal distributed scheduler 202. The rename module 220 is deployed intermediate the NSQ 212 and the pickable scheduler queues 214. As discussed in detail with regard to FIG. 3, the rename module 220 performs renaming operations for the instruction operations received from the NSQ 212, including renaming of architected registers to physical registers in the physical register file 222, and outputs the renamed instruction operations to the multiplexer network 216 for distribution to the plurality of second scheduler queues 214, e.g., by distributing operations to the illustrated two second scheduler queues 214-1 and 214-2 using corresponding pickers 218-1 and 218-2 and a queue controller 226. Each second scheduler queue 214 serves to buffer instruction operations for a corresponding separate subset of the plurality of execution pipes 224. For example, in the illustrated embodiment the second scheduler queue 214-1 buffers instruction operations for a subset composed of execution pipes 224-1, 224-2, and 224-3, whereas the second scheduler queue 214-2 buffers instruction operations for a separate subset composed of execution pipes 224-4, 224-5, and 224-6.

Figure 3:
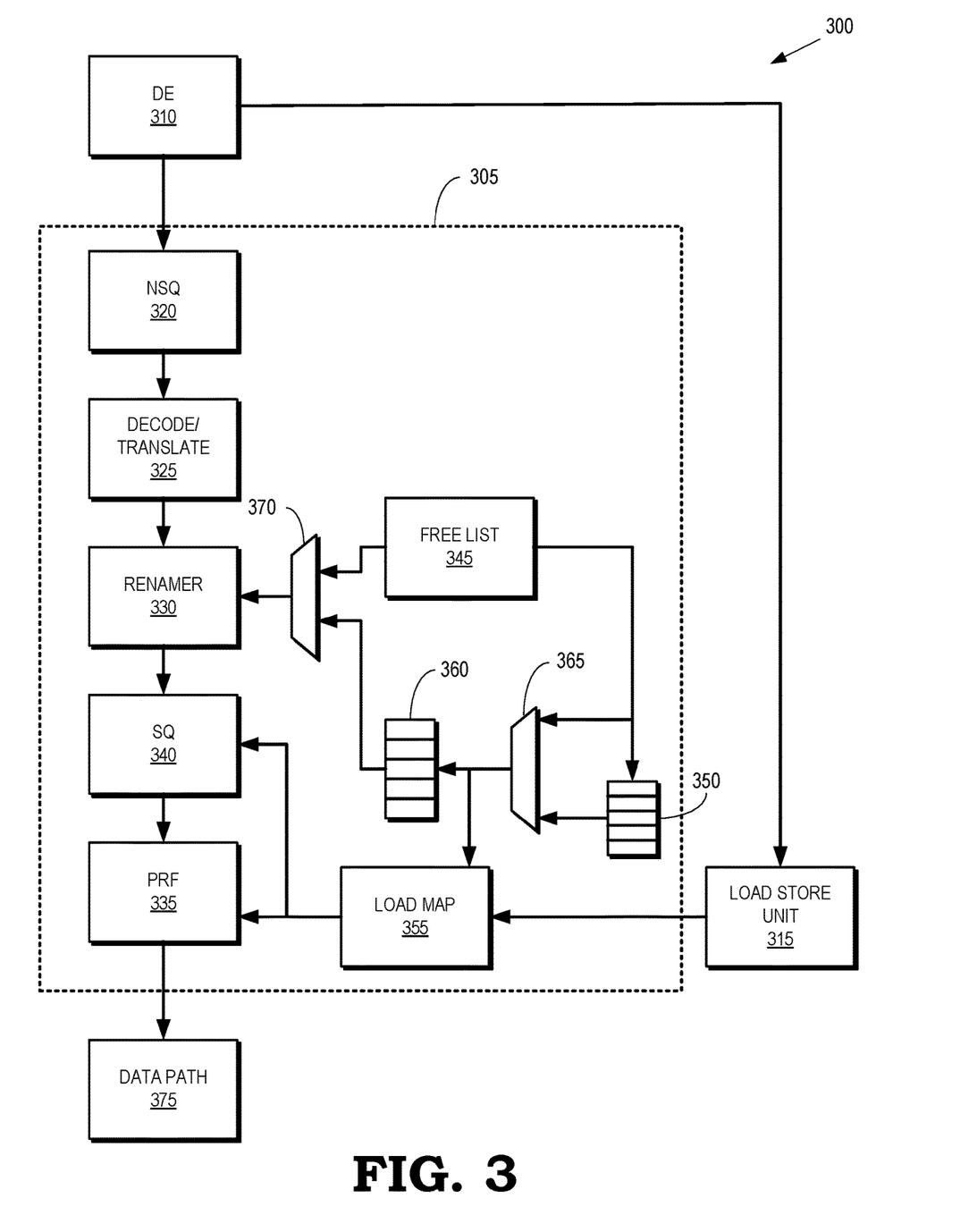
FIG. 3 is a block diagram of a processor including an FPU that implements an NSQ to buffer operations prior to renaming according to some embodiments.

FIG. 3 is a block diagram of a processor 300 including an FPU 305 that implements an NSQ to buffer operations prior to renaming according to some embodiments. The processor 300 is used to implement some embodiments of the processing system 100 shown in FIG. 1 and the processor 200 shown in FIG. 2. An instruction front end (DE) 310 provides instructions or operations to the FPU 305 and other entities within the processor 300 including a load store unit 315. Instructions provided to the FPU 305 frequently include load operations that are used to load data stored in a memory such as the memory 105 shown in FIG. 1. In the illustrated embodiment, the DE 310 concurrently provides load operations to the FPU 305 and the load store unit 315.

Operations received from the DE 310 are initially buffered in an NSQ 320. Buffering load operations prior to further processing in the FPU 305 allows the load store unit 315 additional time to read the load data from the memory before allocating physical register files to the load operations, which increases the number of available physical register files. After buffering the load operation, the operation is popped from the NSQ 320 and provided to a decode/translate module 325, which decodes instructions into one or more instruction operations (e.g., micro-operations, or uops) and translates the virtual addresses included in the instructions or operations. The decoded load operation is provided to a renamer 330 that renames architectural registers and allocates physical registers from a physical register file 335. In response to renaming and allocation of the physical registers, the load operation is provided to a pickable scheduler queue 340.

The FPU 305 implements different processes for renaming architectural registers and allocating physical registers depending on the relative durations of buffering in the NSQ 320 and returning load data from the load store unit 315. The FPU 305 includes a free list 345 that indicates the physical register numbers of available physical registers in the physical register file 335. The free list 345 is implemented using a storage component such as a memory, a register, a buffer, and the like. The FPU also includes a physical register number buffer 350 that stores the physical register numbers of a subset of the available physical registers. Physical register numbers (and the corresponding physical registers) are allocated to load operations from either the free list 345 or the physical register number buffer 350 depending on whether the load operation is popped from the NSQ 320 before or after the load store unit 315 returns the load data. In some embodiments, physical register numbers are allocated to the load operation from the free list 345 in response to the load operation being popped from the NSQ 320 before the load store unit 315 returns the load data. Physical register numbers are allocated to the load operation from the physical register number buffer 350 in response to the load store unit 315 returning the load data before the load operation is popped from the NSQ 320. A load mapper 355 allocates physical register numbers to load operations in response to the load data being returned by the load store unit 315.

Additional circuitry is incorporated in the FPU 305 to coordinate allocation of physical register numbers to the load operations by the free list 345 and the physical register number buffer 350. Some embodiments of the FPU 305 include a mapping structure 360 that maps retire identifiers to physical register numbers that are allocated to the load operation. The information stored in the mapping structure 360 is used to keep track of the allocated physical register numbers until the corresponding load operation retires. Thus, physical register numbers that are allocated to in-flight load operations are not allocated to other operations. The information stored in the mapping structure 360 is also used to determine whether a physical register number has already been allocated to a load operation. For example, entries in the mapping structure 360 are checked before allocating a physical register number to a load operation that is popped off the NSQ 320 to ensure that a different physical register number has not already been allocated to the load operation in response to the load store unit 315 returning the load data for the load operation. Thus, the mapping structure 360 prevents allocation of another physical register number to the same load operation. The multiplexers 365, 370 are used to coordinate the distribution of information from the free list 345 and the physical register number buffer 350 to the mapping structure 360 and in the renamer 330.

The FPU 305 provides the load operation to a data path 375 in response to the load store unit 315 successfully loading the load data and the necessary physical registers being allocated to the load operation.

Figure 4:
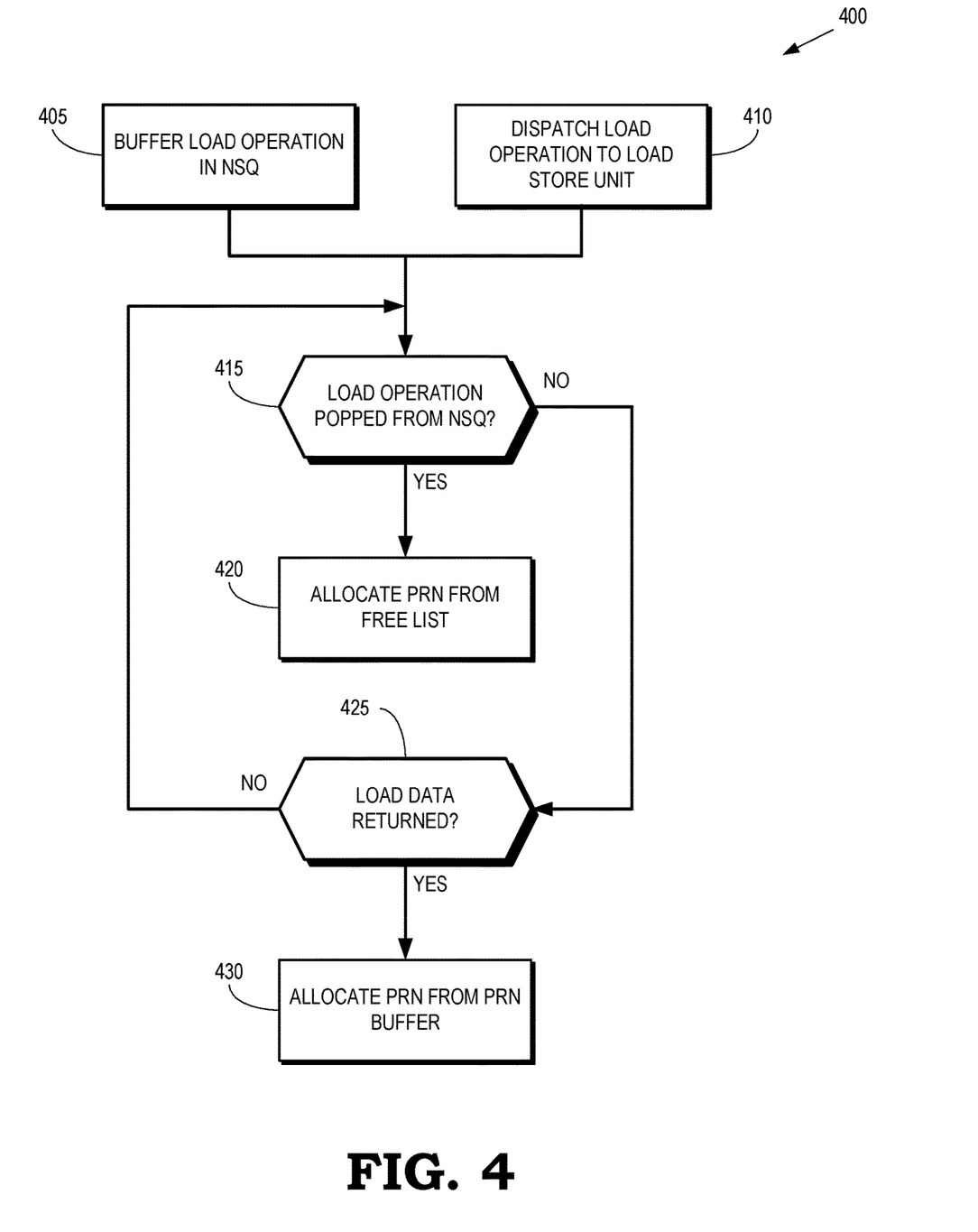
FIG. 4 is a flow diagram of a method of selectively allocating physical register numbers from a free list or a physical register number buffer according to some embodiments.

FIG. 4 is a flow diagram of a method 400 of selectively allocating physical register numbers from a free list or a physical register number buffer according to some embodiments. The method 400 is implemented in an FPU such as some embodiments of the FPU 150 shown in FIG. 1, the floating point/SIMD unit 208 shown in FIG. 2, and the FPU 305 shown in FIG. 3.

At block 405, the FPU buffers a load operation in an NSQ (such as the NSQ 212 shown in FIG. 2 or the NSQ 320 shown in FIG. 3) and, at block 410, the load operation is dispatched to a load store unit such as the load store unit 315 shown in FIG. 3. Buffering the load operation at block 405 is performed concurrently with dispatching the load operation at block 410.

At decision block 415, the FPU determines whether the load operation has been popped from the NSQ. If so, the method 400 flows to block 420 and a physical register number is allocated to the load operation from a free list such as the free list 345 shown in FIG. 3. If the load operation has not yet been popped from the NSQ, the method 400 flows to decision block 425.

At decision block 425, the FPU determines whether the load store unit has returned the load data required by the load operation. If so, the method 400 flows to block 430 and a physical register number is allocated to the load operation from a physical register number buffer such as the physical register number buffer 350 shown in FIG. 3. If the load store unit has not yet returned to the load data, the method 400 flows to decision block 415 and another iteration of the method 400 is performed. Some embodiments of the method 400 are iterated once per clock cycle, although other iteration time intervals are used in other embodiments.

In some embodiments, the apparatus and techniques described above are implemented in a system including one or more integrated circuit (IC) devices (also referred to as integrated circuit packages or microchips), such as the FPU described above with reference to FIGS. 1-4. Electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device is stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media include, but are not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device is not required in some embodiments, and that one or more further activities are sometimes performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. An apparatus, comprising:
   a non-pickable scheduler queue (NSQ) configured to buffer a load operation concurrently with a load store unit retrieving load data indicating a target address for an operand that is to be loaded by the load operation;
   a renamer configured to rename architectural registers used by the load operation and allocate physical register numbers to the load operation in response to receiving the load operation from the NSQ; and
   a set of pickable scheduler queues configured to receive the load operation from the renamer and store the load operation prior to execution.

2. The apparatus of claim 1, further comprising:
   a physical register file; and
   a storage component configured to store a free list indicating physical register numbers of entries in the physical register file that are available for allocation.

3. The apparatus of claim 2, wherein a physical register number is allocated to the load operation from the free list in response to the load operation being popped from the NSQ before the load store unit returns the load data.

4. The apparatus of claim 2, further comprising:
   a physical register number buffer configured to store a subset of the physical register numbers of the entries in the physical register file that are available for allocation.

5. The apparatus of claim 4, wherein a physical register number is allocated to the load operation from the physical register number buffer in response to the load store unit returning the load data before the load operation is popped from the NSQ.

6. The apparatus of claim 4, further comprising:
   a load mapper that allocates physical register numbers to load operations in response to the load data being returned by the load store unit.

7. The apparatus of claim 6, further comprising:
   a mapping structure that maps retire identifiers to physical register numbers allocated to the load operation to prevent allocating another physical register number to the same load operation.

8. The apparatus of claim 1, wherein:
   the set of pickable scheduler queues is configured to store operations for a plurality of execution pipes; and
   each pickable scheduler queue in the set stores operations for a different subset of the plurality of execution pipes.

9. A method, comprising:
   performing a load operation in a non-pickable scheduler queue (NSQ) concurrently with a load store unit retrieving load data indicating a target address for an operand that is to be loaded by the load operation;
   in response to receiving the load operation at a renamer from the NSQ, renaming architectural registers used by the load operation and allocating physical register numbers to the load operation; and providing the load operation from the renamer to one of a set of pickable scheduler queues that are configured to store the load operation prior to execution.

10. The method of claim 9, further comprising:
storing, in a free list, physical register numbers of entries in a physical register file that are available for allocation.

11. The method of claim 10, further comprising:
allocating a physical register number to the load operation from the free list in response to the load operation being popped from the NSQ before the load store unit returns the load data.

12. The method of claim 10, further comprising:
storing, in a physical register number buffer, a subset of the physical register numbers of the entries in the physical register file that are available for allocation.

13. The method of claim 12, further comprising:
allocating a physical register number to the load operation from the physical register number buffer in response to the load store unit returning the load data before the load operation is popped from the NSQ.

14. The method of claim 13, wherein allocating the physical register number comprises allocating the physical register number to the load operation using a load mapper in response to the load data being returned by the load store unit.

15. The method of claim 14, further comprising:
mapping retire identifiers to physical register numbers allocated to the load operation to prevent allocating another physical register number to the same load operation.

16. The method of claim 9, further comprising:
storing, in the set of pickable scheduler queues, operations for a plurality of execution pipes, wherein each pickable scheduler queue in the set stores operations for a different subset of the plurality of execution pipes.

17. An apparatus, comprising:
a physical register file;
a storage component configured to store a free list indicating physical register numbers of entries in the physical register file that are available for allocation; and
a non-pickable scheduler queue (NSQ) configured to buffer load operations concurrently with a load store unit retrieving load data indicating target addresses associated with the load operations, wherein the physical register numbers on the free list are allocated to the load operations in response to popping the load operations from the NSQ or in response to the load store unit returning the load data.

18. The apparatus of claim 17, further comprising:
a renamer configured to rename architectural registers used by the load operation and allocate physical register numbers to the load operation in response to receiving the load operation from the NSQ; and
a set of pickable scheduler queues configured to receive the load operation from the renamer and store the load operation prior to execution.

19. The apparatus of claim 18, wherein a physical register number is allocated to the load operation from the free list in response to the load operation being popped from the NSQ before the load store unit returns the load data.

20. The apparatus of claim 18, further comprising:
a physical register number buffer configured to store a subset of the physical register numbers of the entries in the physical register file that are available for allocation.

21. The apparatus of claim 20, wherein a physical register number is allocated to the load operation from the physical register number buffer in response to the load store unit returning the load data before the load operation is popped from the NSQ.

22. The apparatus of claim 20, further comprising:
a load mapper that allocates physical register numbers to load operations in response to the load data being returned by the load store unit.

23. The apparatus of claim 22, further comprising:
a mapping structure that maps retire identifiers to physical register numbers allocated to the load operation to prevent allocating another physical register number to the same load operation.

24. The apparatus of claim 18, wherein:
the set of pickable scheduler queues is configured to store operations for a plurality of execution pipes; and
each pickable scheduler queue in the set stores operations for a different subset of the plurality of execution pipes.

* * * * *